United States Patent
Arita et al.

(10) Patent No.: US 8,311,735 B2
(45) Date of Patent: Nov. 13, 2012

(54) NAVIGATION SYSTEM

(75) Inventors: Hidekazu Arita, Tokyo (JP); Masahito Hata, Tokyo (JP); Shigeru Tateishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1361 days.

(21) Appl. No.: 11/663,501

(22) PCT Filed: Oct. 5, 2005

(86) PCT No.: PCT/JP2005/018460
§ 371 (c)(1),
(2), (4) Date: Mar. 22, 2007

(87) PCT Pub. No.: WO2006/064605
PCT Pub. Date: Jun. 22, 2006

(65) Prior Publication Data
US 2008/0004800 A1    Jan. 3, 2008

(30) Foreign Application Priority Data
Dec. 13, 2004  (JP) .................................. 2004-360152

(51) Int. Cl.
*G01C 21/00*    (2006.01)
(52) U.S. Cl. ........ 701/450; 701/400; 701/451; 701/452; 701/453
(58) Field of Classification Search .................. 701/400, 701/450–453
See application file for complete search history.

(56) References Cited

U.S. PATENT DOCUMENTS

| 6,061,003 A | 5/2000 | Harada |
| 6,546,334 B1* | 4/2003 | Fukuchi et al. ............... 701/208 |
| 6,691,128 B2* | 2/2004 | Natesan et al. ........................ 1/1 |
| 2003/0158651 A1* | 8/2003 | Matsuo et al. ............... 701/200 |
| 2004/0002812 A1 | 1/2004 | Yamanaka |

FOREIGN PATENT DOCUMENTS

| JP | 11-38870 A | 2/1999 |
| JP | 11-230770 A | 8/1999 |
| JP | 2001-012957 A | 1/2001 |
| JP | 2001-165669 A | 6/2001 |
| JP | 2001-165675 A | 6/2001 |
| JP | 2003-247843 A | 9/2003 |
| JP | 2003-315052 A | 11/2003 |
| JP | 2004-101982 A | 4/2004 |
| JP | 2004-125510 A | 4/2004 |

* cited by examiner

*Primary Examiner* — Khoi Tran
*Assistant Examiner* — Bhavesh V Amin
(74) *Attorney, Agent, or Firm* — Birch, Stewart, Kolasch & Birch, LLP

(57) ABSTRACT

An update map data acquiring means 6 for acquiring update map data is disposed in a navigation system. Even when a navigation function is being used by a control means 5 which controls the functions of the whole navigation system using yet-to-be-updated map data stored in a map data storing means 2, the control means updates the map data by writing the update map data from the update map data acquiring means 6 in a free space on the map data storing means 2.

9 Claims, 5 Drawing Sheets

NAVIGATION SYSTEM

FIELD OF THE INVENTION

The present invention relates to a navigation system equipped with a rewritable map data storing means. More particularly, it relates to an update of map data in a navigation system.

BACKGROUND OF THE INVENTION

Conventionally, an update of map data in a navigation system equipped with a rewritable map data storing means is performed by temporarily detaching the map data storing means from the navigation system and then updating the map data using a special-purpose map data rewriting means, and attaching the map data storing means again to the navigation system, or by stopping the navigation system to copy update map data to the map data storing means using an update map data acquiring means by means of a system loader (for example, refer to patent references 1 to 3).
Patent reference 1: JP,2001-165675,A
Patent reference 2: JP,2001-165669,A
Patent reference 3: JP,2003-315052,A A problem with an update of map data in a prior art navigation system is, however, that because it is performed by temporarily detaching a map data storing means for storing the map data from the navigation system and then attaching the map data storing means again to the navigation system, or by stopping the navigation system to copy update map data to the map data storing means, the functions of the navigation system cannot be used at all during the update of the map data.

The present invention is made in order to solve the above-mentioned problem, and it is therefore an object of the present invention to provide a navigation system which, when updating map data, enables the update of the map data while using a navigation function by starting writing update map data in a free space on a map data storing means.

DISCLOSURE OF THE INVENTION

In accordance with the present invention, there is provided a navigation system in which an update map data acquiring means for acquiring update map data is disposed, and, even when a navigation function is being used by a control means which controls the functions of the whole navigation system using yet-to-be-updated map data stored in a map data storing means, the control means updates the map data by writing the update map data from the update map data acquiring means in a free space on the map data storing means.

In accordance with the present invention, the navigation system enables the update of the map data using the navigation function, and displays the status of the writing (referred to as download from here on) of the update map data in the map data storing means on the display means. Therefore, the navigation system can notify the user of the status of the download so that the user can judge the status of the download easily, and can update the map data efficiently.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
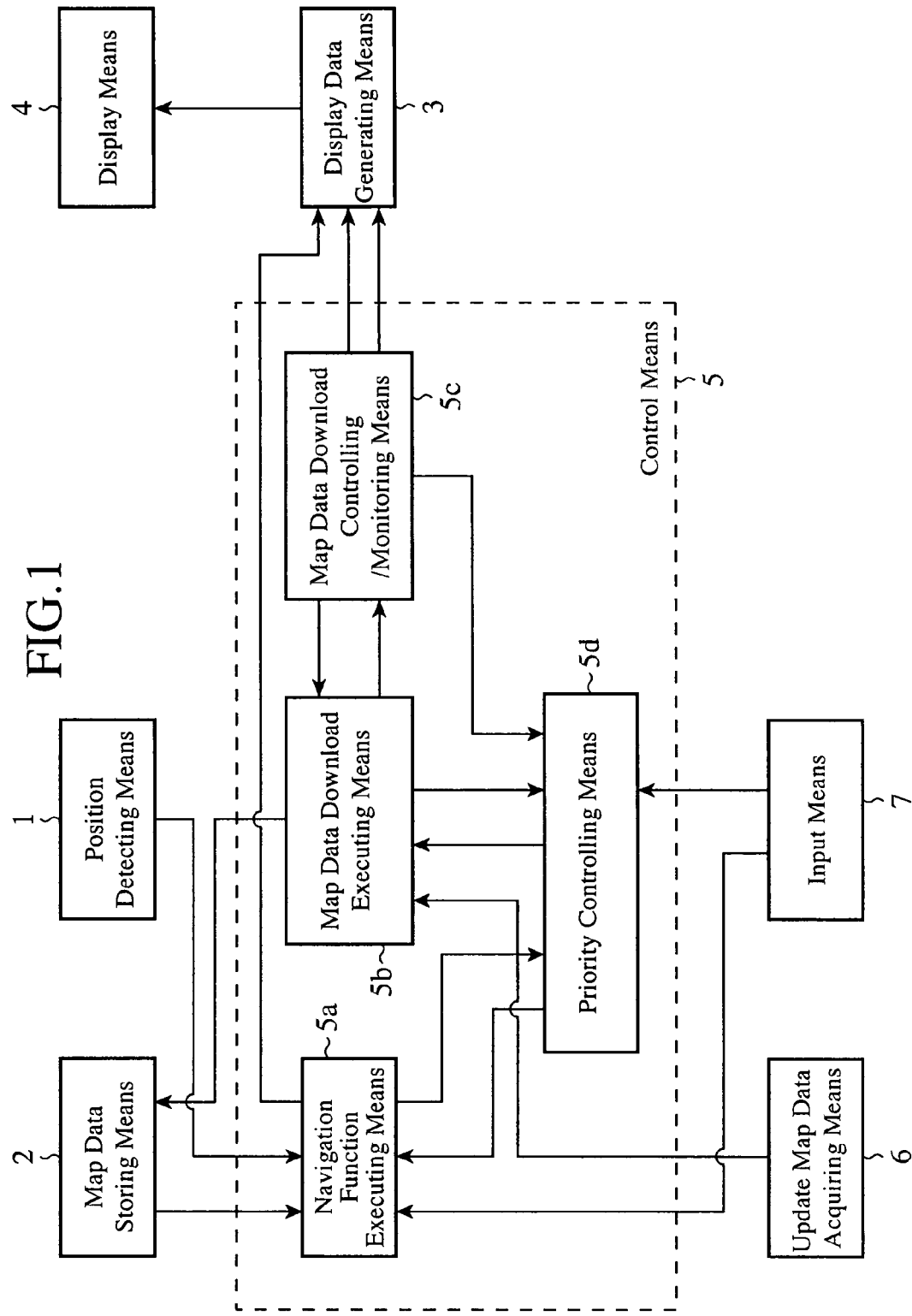
FIG. 1 is a block diagram showing the entire configuration of a navigation system in accordance with embodiment 1 of the present invention.

FIG. 1 is a block diagram showing the structure of a navigation system in accordance with embodiment 1 of the present invention.

In FIG. 1, the navigation system in accordance with this embodiment 1 is provided with a position detecting means 1 for detecting the current position of a vehicle, a map data storing means 2 for storing map data, a display data generating means 3 for generating data for display, a display means 4 which is connected to this display data generating means 3, and which consists of a liquid crystal display or the like, a control means 5 to which the position detecting means 1, map data storing means 2, and display data generating means 3 are connected, an update map data acquiring means 6 which is connected to this control means 5 and which is implemented by a DVD drive or radio equipment, such as a USB or Bluetooth (registered trademark) device, and an input means 7 which is implemented by, for example, an infrared remote controller, softkeys on a touch panel, hardkeys, or voice recognition, for receiving an input from the user and for furnishing the input to the control means 5.

The position detecting means 1 acquires GPS (Global Positioning System) data or data about a vehicle velocity pulse, an acceleration sensor, a gyroscope, etc. as data to be inputted to the control means 5. The map data storing means 2 is a rewritable data storing means, such as a hard disk or a solid-state memory, and the display data generating means 3 generates data for display, such as map data and various pieces of information, when using a navigation function.

The control means 5 substantially consists of a CPU and a program which the CPU executes. Using the program, the control means 5 carries out various control operations including reading out of map data from the map data storing means 2, writing of update map data acquired from the update map data acquiring means 6 in the map data storing means 2, interpretation of an input by the user from the input means 7, and mapping of the vehicle position onto the map data through acquisition of data from the position detecting means 1. To this end, the control means 5 is provided with a navigation function execution means 5a for executing the navigation function, a map data download executing means 5b for executing a map data download function, a map data download controlling/monitoring means 5c for controlling and monitoring the map data download function, and a priority controlling means 5d for deciding priorities to be respectively assigned to the navigation function execution and the download execution, and for controlling the whole of the system.

While the navigation function execution means 5a has an input and an output interconnected with an output and an input of the priority controlling means 5d, respectively, the position detecting means 1, map data storing means 2, and input means 7 are connected to the input of the navigation function execution means 5*a* and the output of the navigation function execution means 5*a* is also connected to the display data generating means 3. While the map data download executing means 5*b* has an input and an output interconnected with the output and input of the priority controlling means 5*d*, respectively, the update map data acquiring means 6 is connected to the input of the map data download executing means 5*b* and the output of the map data download executing means 5*b* is also connected to the map data storing means 2. While the map data download controlling/monitoring means 5*c* has an input and an output interconnected with the output and input of the map data download executing means 5*b*, respectively, the output of the map data download controlling/monitoring means 5*c* is connected to the display data generating means 3 and priority controlling means 5*d*.

The display data generating means 3 generates data for display at a high speed. As an alternative, the control means can generate data for display.

Figure 2:
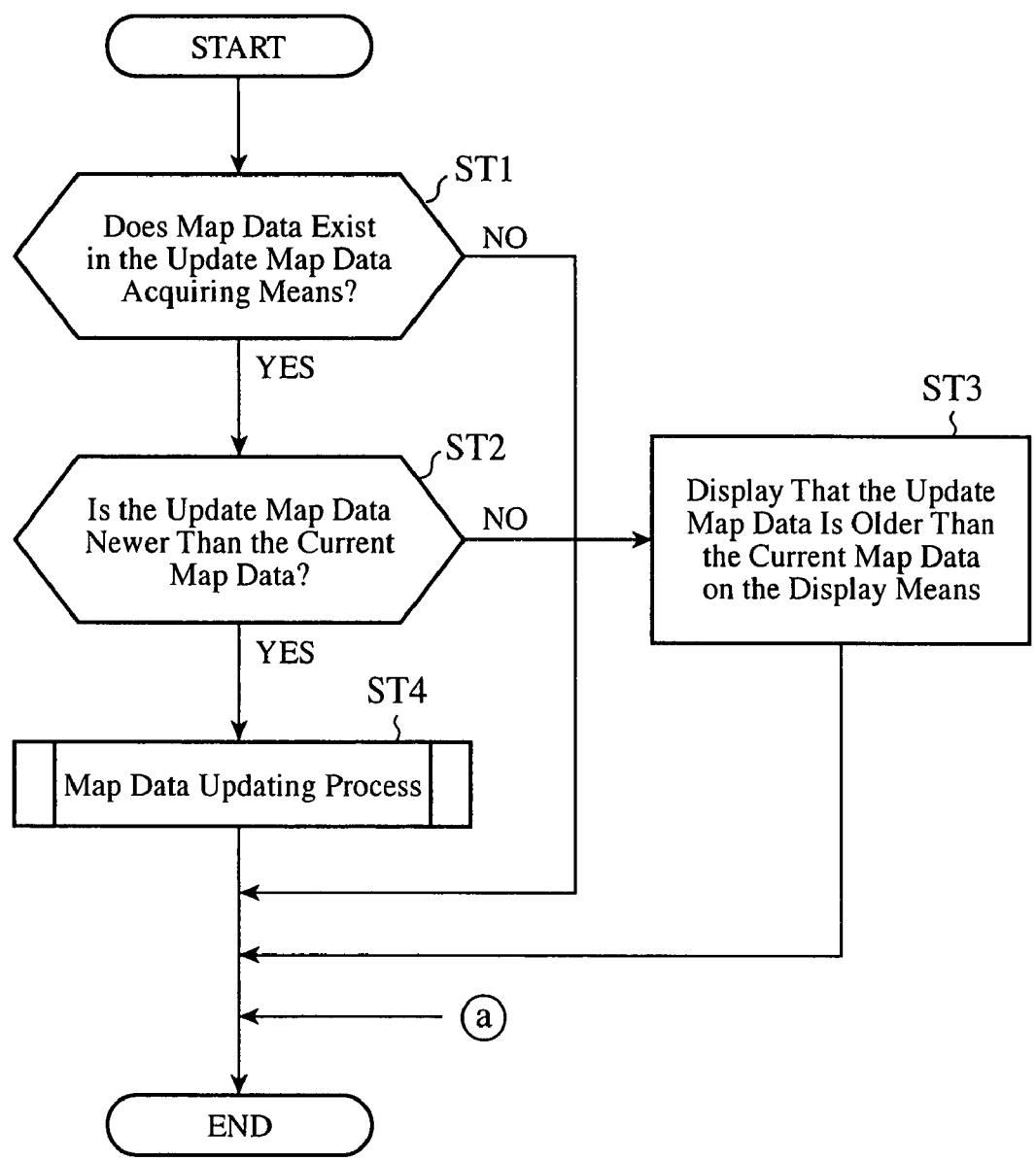
FIG. 2 is a flow chart for explaining pre-processing which is performed before map data update processing is performed in embodiment 1 of the present invention.

Next, the operation of the navigation system will be explained with reference to FIGS. 2 and 3.

First, a process which is performed before the map data updating process is performed will be explained with reference to FIG. 2.

In step ST1, the control means judges whether map data, i.e., update map data exists in the update map data acquiring means 6, and ends the processing when no update map data exists in the update map data acquiring means. In contrast, when update map data exists in the update map data acquiring means, the control means, in step ST2, judges whether or not the update map data is newer than the current map data, and, when determining that the update map data is not newer than the current map data, in step ST3, displays that the update map data is older than the current map data on the display means 4, and ends the processing. In contrast, when, in step ST2, determining that the update map data is newer than the current map data, the control means, in step ST4, carries out a map data updating process on the basis of the update map data from the update map data acquiring means 6, and ends the processing.

Next, the details of the map data updating process in step ST4 of FIG. 2 will be explained with reference to FIG. 3.

The control means 5, in step ST11, judges whether the priority controlling means 5*d* of the control means 5 has allowed the updating process of updating the map data to proceed. When the map data is updated using the navigation function, because a higher priority is usually given to the navigation function executed by the navigation function execution means 5*a*. Therefore, when the CPU has a capability enough to carry out other processing while performing the navigation function, the control means downloads the update map data map data from the update map data acquiring means 6 using the map data download executing means 5*b*. When the priority controlling means has not allowed the updating process of updating the map data to proceed, the control means returns to step ST11. In contrast, when the priority controlling means has allowed the updating process of updating the map data to proceed, the map data download controlling/monitoring means 5*c*, in step ST12, judges whether the map data download executing means 5*b* has downloaded all of the update map data from the update map data acquiring means 6 into the map data storing means 2. When the map data download executing means has downloaded all of the update map data, the control means, in step ST13, displays that the update of the map is completed on the display means 4 via the display data generating means 3, and ends the processing. When the download of the map data is not completed, the map data download executing means, in step ST14, downloads some of yet-to-be-downloaded data in the update map data to the map data storing means 2, returns to step ST11, and repeats the above-mentioned operation.

Thus, in accordance with this embodiment 1, even when using the navigation function using yet-to-be-updated map data which is stored in the map data storing means, the navigation system can carry out update the map data while using the navigation function because the navigation system writes the map data updated into the free space on the map data storing means. Furthermore, because the navigation system displays the status of the download of update map data in the map data storing means on the display means, the navigation system can notify the user of the status of the download so that the user can judge the status of the download easily, and can update the map data efficiently.

Embodiment 2

Figure 3:
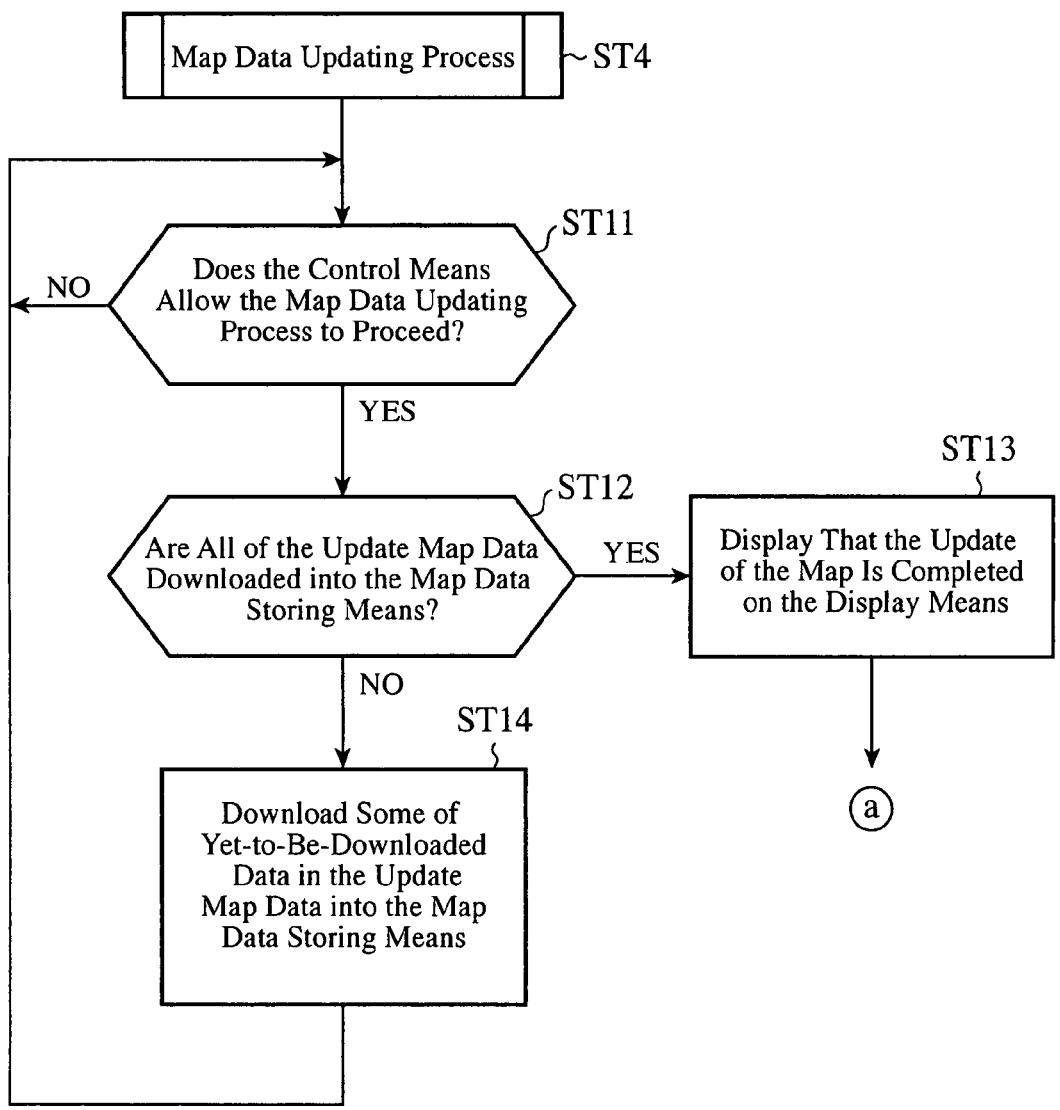
FIG. 3 is a flow chart for explaining a fundamental process of the map data update processing in embodiment 1 of the present invention.
Figure 4:
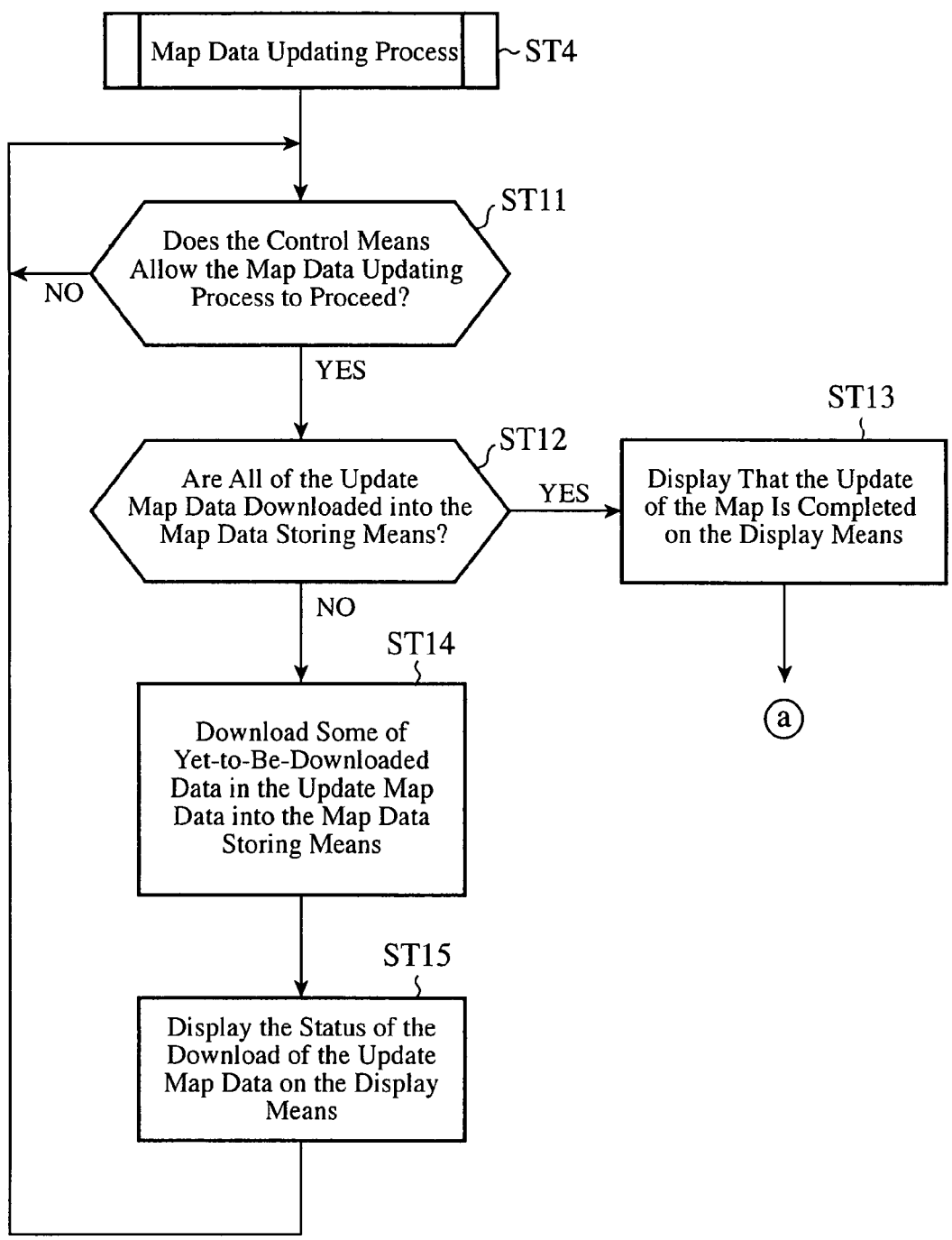
FIG. 4 is a flow chart for explaining a fundamental process of map data update processing in embodiment 2 of the present invention.

FIG. 4 is a flow chart for explaining an operation of updating map data in a navigation system in accordance with embodiment 2 of the present invention. It particularly shows a flow chart for explaining the details of a map data updating process, like above-mentioned FIG. 3. Therefore, in FIG. 4, substantially the same processing is carried out in the same steps as those of FIG. 3. Because the circuit structure of the navigation system is the same as that in the case of FIG. 1, the explanation of the circuit structure will be omitted hereafter.

In performing steps ST11 to ST14, a control means, in step ST1, judges whether a priority controlling means 5*d* has allowed the updating process of updating the map data to proceed, as in the case of FIG. 3, in step ST12, judges whether a map data download executing means 5*b* has downloaded all of update map data from an update map data acquiring means 6 into a map data storing means 2, in step ST13, displays that the update of the map is completed on a display means 4, and, when the update of the map has not been completed in step ST13, in step ST14, downloads some of yet-to-be-downloaded data in the update map data into the map data storing means 2.

In this embodiment, the control means, in step ST15, displays the status of the download of the update map data by the map data download executing means 5*b* on the display means 4. As the status of the download, what percentage of all the update map data has been downloaded is shown in number or in bar graph, a map is displayed with locations corresponding already-downloaded update map data being shown, or a predicted remaining time required for the completion of the download is displayed. When, in step ST15, the display of the status of the download of all the update map data is completed, the control means returns to step ST11 in which it repeats the above-mentioned operation.

In this embodiment, although it is assumed that the display data generating means 3 and display means 4 display a map and characters on the screen, information, such as a sound, can be outputted instead of characters. When the navigation function is not used, the length of time that the control means 5 allows the map data updating process in step ST11 to proceed becomes long dramatically and therefore the time required for the update can be shortened.

Thus, in accordance with this embodiment 2, because the navigation system displays the status of the download of update map data in the map data storing means on the display means, and then notifies the user of the status of the download, the user can easily judge the status of the download. Furthermore, because the user can arbitrarily combine download with the navigation function and download without the navigation function, the time required for updating the map data can be shortened.

Embodiment 3

Figure 5:
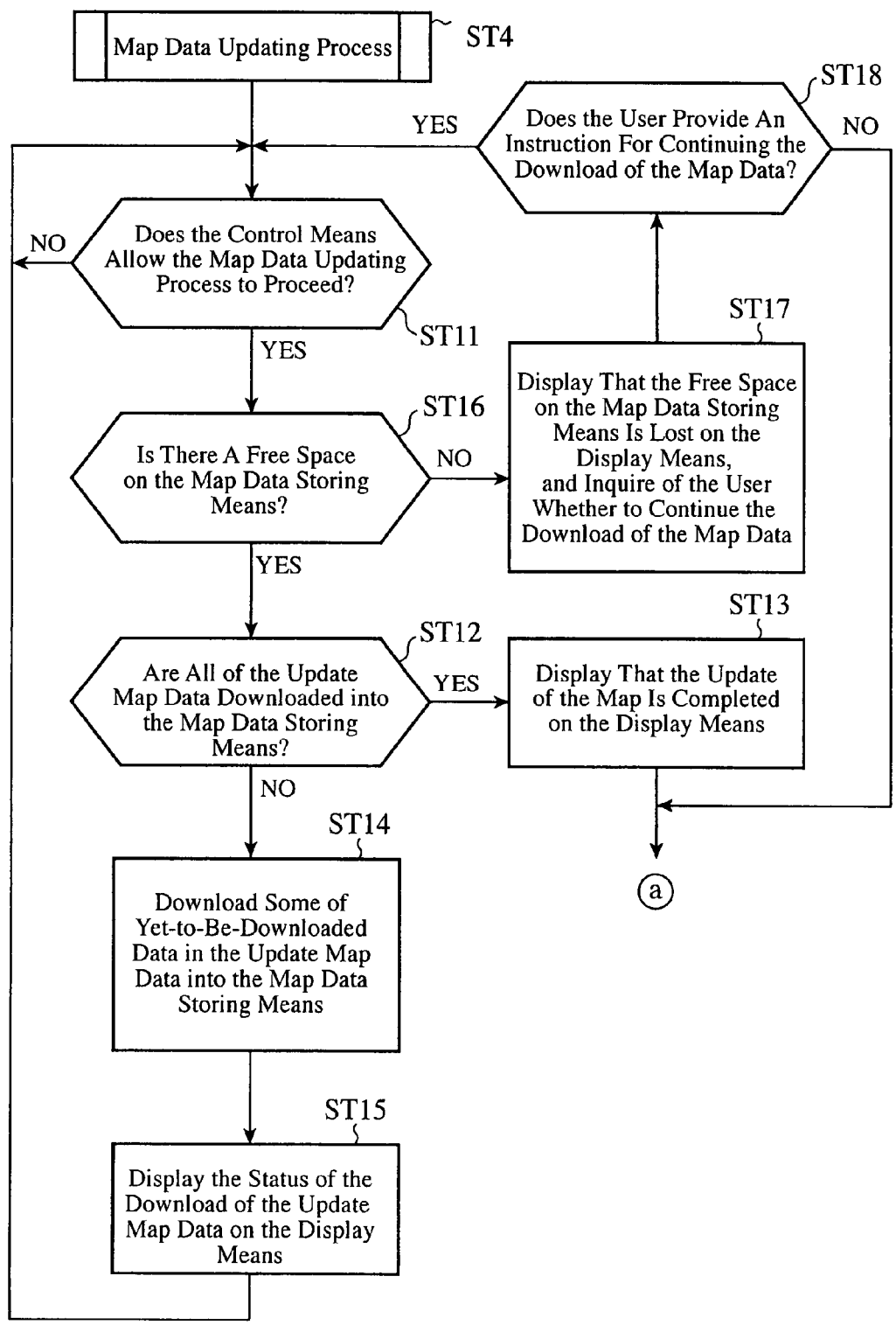
FIG. 5 is a flow chart for explaining a fundamental process of map data update processing in embodiment 3 of the present invention.

FIG. 5 is a flow chart for explaining an operation of updating map data in a navigation system in accordance with embodiment 3 of the present invention. It particularly shows a flow chart for explaining the details of a map data updating process, like above-mentioned FIGS. 3 and 4. The process shown in FIG. 5 has steps which are the same as those shown in FIG. 4, except for steps ST16, ST17, and ST18 which are added after step ST11 of FIG. 4, and substantially the same processing as shown in the above-mentioned embodiments is carried out in the same steps. Because the circuit structure of the navigation system is the same as that in the case of FIG. 1, the explanation of the circuit structure will be omitted hereafter.

In accordance this embodiment, even when the maintenance of the map data is proceeded and then the amount of update map data downloaded exceeds one-half of the capacity of a map data storing means 2, the navigation system enables the update of the map data using the navigation function as much as possible.

A control means, in step ST11, judges whether a priority controlling means 5d has allowed the update process of updating the map data to proceed, and, when the priority controlling means has not allowed the update process to proceed, returns to step ST11. In contrast, when the priority controlling means has allowed the update process of updating the map data to proceed, the control means, in step ST16, judges whether there is a free space on the map data storing means 2, and, when there is a free space, advances to step ST12 in which it carries out the same processing as mentioned above, whereas when there is no free space on the map data storing means, the control means, in step ST17, displays that the free space on the map data storing means 2 is lost on a display means 4, and inquires of the user whether to continue the download of the map data.

The control means then, in step ST18, judges whether the user has instructed to continue the download of the map data, and when determining that the user has instructed to continue the download of the map data, returns to step ST11, whereas when determining that the user has not instructed to continue the download of the map data, ends the map data updating process.

Thus, in accordance with this embodiment 3, when the size of the free space on the map data storing means is smaller than the size of the update map data, the control means writes the update map data in the map data storing means while using the navigation function until the free space on the map data storing means is lost, and, when the free space is lost, inquires of the user whether to continue the writing of the update map data or to interrupt the writing of the update map data temporarily to continue using the navigation function, and then allows the user to provide an instruction thereto using an input means. Therefore, even when the capacity of the map data storing means is smaller than the sum of the amount of the current map data and that of the update map data, the navigation system can continue to update the map data using the navigation function until the free space on the map data storing means is lost.

Industrial Applicability

As mentioned above, the navigation system in accordance with the present invention is suitable for updating the map data using the navigation function.

The invention claimed is:

1. A navigation system provided with a position detecting unit for detecting a current position of a vehicle, a map data storing unit for storing map data about roads, a display data generating unit for reading map data about a surrounding area from said map data storing unit based on the current position of the vehicle detected by said position detecting unit, and for generating data for display, a display unit for displaying the data for display generated by said display data generating unit, and a control unit for controlling functions of the navigation system, wherein an update map data acquiring unit for acquiring update map data is disposed, and, while said control unit is using a navigation function using yet-to-be-updated map data stored in said map data storing unit, said navigation system updates the map data by writing the update map data from said update map data acquiring unit in a free space on said map data storing unit, and wherein when judging that the navigation function is not needed according to an instruction from a user, the control unit stops the navigation function, and focuses its capability toward writing the update map data in said map data storing unit so as to update the map data.

2. A navigation system provided with a position detecting unit for detecting a current position of a vehicle, a map data storing unit for storing map data about roads, a display data generating unit for reading map data about a surrounding area from said map data storing unit based on the current position of the vehicle detected by said position detecting unit, and for generating data for display, a display unit for displaying the data for display generated by said display data generating unit, and a control unit for controlling functions of the navigation system, wherein an update map data acquiring unit for acquiring update map data is disposed, and, while said control unit is using a navigation function using yet-to-be-updated map data stored in said map data storing unit, said navigation system updates the map data by writing the update map data from said update map data acquiring unit in a free space on said map data storing unit, and wherein when the free space on the map data storing unit has a size smaller than that of the update map data, the control unit writes the update map data in the free space on said map data storing unit while using the navigation function until the free space is lost, and, when the free space is lost, inquires of the user whether to continue the writing of the update map data or to interrupt the writing of the update map data temporarily and continue using the navigation function, and allows the user to provide an instruction thereto using an input unit.

3. A navigation system provided with a position detecting unit for detecting a current position of a vehicle, a map data storing unit for storing map data about roads, a display data generating unit for reading map data about a surrounding area from said map data storing unit based on the current position of the vehicle detected by said position detecting unit, and for generating data for display, a display unit for displaying the data for display generated by said display data generating unit, and a control unit for controlling functions of the navigation system, wherein an update map data acquiring unit for acquiring update map data is disposed, and, while said control unit is using a navigation function using yet-to-be-updated map data stored in said map data storing unit, said navigation system updates the map data by writing the update map data from said update map data acquiring unit in a free space on said map data storing unit, and wherein the control includes: a navigation function execution unit connected to the position detecting unit, the map data storing unit, and the display data generating unit, for executing the navigation function; a map data download executing unit connected to said map data storing unit and said update map data acquiring unit, for performing download of map data; and a priority controlling unit connected to said navigation function execution unit and said map data download executing unit, for determining a priority of the navigation function execution and a priority of the download execution.

4. The navigation system according to any one of claims 2, and 3, wherein the control unit displays a writing status of the writing of the update map data from the update map data acquiring unit in the map data storing unit on the display unit.

5. The navigation system according to any one of claims 2, and 3, wherein
said acquired update map data represents a newer version of said yet-to-be-updated map data used for the navigation function.

6. The navigation system according to any one of claims 2, and 3, wherein
said acquired update map data represents newer map data than said yet-to-be-updated map data used for the navigation function for same geographical locations.

7. The navigation system according to any one of claims 2, and 3, wherein said navigation system is in the vehicle.

8. The navigation system according to any one of claims 2, and 3, wherein
said control unit includes a navigation function execution unit for executing a navigation function including determining a route from the current position to a destination, and providing guidance along said route using said map data stored.

9. The navigation system according to any one of claims 2, and 3, wherein said update map data acquiring unit is a memory device reader.

\* \* \* \* \*

UNITED STATES PATENT AND TRADEMARK OFFICE
CERTIFICATE OF CORRECTION

PATENT NO. : 8,311,735 B2
APPLICATION NO. : 11/663501
DATED : November 13, 2012
INVENTOR(S) : Hidekazu Arita et al.

Page 1 of 1

It is certified that error appears in the above-identified patent and that said Letters Patent is hereby corrected as shown below:

At column 7 and 8, claims 4, 5, 6, 7, 8 and 9, lines 1 and 2 of each, change "any one of claims 2, and 3" to --any one of claims 1, 2, and 3--.

Signed and Sealed this
Twenty-sixth Day of February, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,311,735 B2 | Page 1 of 1 |
| APPLICATION NO. | : 11/663501 | |
| DATED | : November 13, 2012 | |
| INVENTOR(S) | : Hidekazu Arita et al. | |

It is certified that error appears in the above-identified patent and that said Letters Patent is hereby corrected as shown below:

In the Claims:

Column 7, lines 7-8 (Claim 4, lines 1 and 2) change "any one of claims 2, and 3" to --any one of claims 1, 2, and 3--.

Column 7, lines 11-12 (Claim 5, lines 1 and 2) change "any one of claims 2, and 3" to --any one of claims 1, 2, and 3--.

Column 7, lines 16-17 (Claim 6, lines 1 and 2) change "any one of claims 2, and 3" to --any one of claims 1, 2, and 3--.

Column 8, lines 4-5 (Claim 7, lines 1 and 2) change "any one of claims 2, and 3" to --any one of claims 1, 2, and 3--.

Column 8, lines 6-7 (Claim 8, lines 1 and 2) change "any one of claims 2, and 3" to --any one of claims 1, 2, and 3--.

Column 8, lines 13-14 (Claim 9, lines 1 and 2) change "any one of claims 2, and 3" to --any one of claims 1, 2, and 3--.

This certificate supersedes the Certificate of Correction issued February 26, 2013.

Signed and Sealed this
Sixteenth Day of April, 2013

Teresa Stanek Rea
*Acting Director of the United States Patent and Trademark Office*